United States Patent

Lee, Jr.

[15] 3,699,262

[45] Oct. 17, 1972

[54] SCANNER AND TRANSLATOR-MARKER ARRANGEMENT FOR PBX

[72] Inventor: Ernest O. Lee, Jr., Fairport, N.Y.

[73] Assignee: Stromberg-Carlson Corporation, Rochester, N.Y.

[22] Filed: Dec. 15, 1970

[21] Appl. No.: 98,431

[52] U.S. Cl. ..........................179/18 ET, 179/18 FH

[51] Int. Cl. ..........................................H04q 3/47

[58] Field of Search .179/18 E, 18 EA, 18 ET, 18 EB

[56] References Cited

UNITED STATES PATENTS 3,524,024 8/1970 Olsson et al. ..........179/18 ET

FOREIGN PATENTS OR APPLICATIONS 1,191,200 5/1970 Great Britain .........179/18 ET

*Primary Examiner*—William C. Cooper
*Attorney*—Craig, Antonelli, Stewart & Hill

[57] ABSTRACT

A line scanner and translator-marker arrangement which provides for the strapping of digit signal outputs from a scanner in selective combinations to respective line circuits so that scanning and marking automatically includes translation which is performed on a continuous basis. As a result, the arrangement provides for two-way operation; not only performing marking of the line circuits for extending calls but also in reverse operation to detect the identity of a marked line circuit without additional equipment, where said identity may be independent of the physical location of the line circuit.

12 Claims, 5 Drawing Figures

SCANNER AND TRANSLATOR-MARKER ARRANGEMENT FOR PBX

The present invention relates in general to automatic telephone systems, and more particularly to a line scanner and translator-marker arrangement for an electronic private branch exchange (EPBX).

In many automatic telephone systems, including central exchanges and private branch exchanges, line circuits are often designated by an equipment number and access to these line circuits often requires a designation of the equipment number from the accessing equipment. Thus, in the case wherein the called number is identified within the system by its equipment number and outside the equipment by its directory number, a translator is required in the system to relate the called directory number to the called equipment number. In such systems, the need for a separate translator within the system requires an additional transfer of data commonly in binary form to the translator before the equipment number of the called line circuit can be determined and the additional transfer of the equipment number in binary form to line scanner and marker circuits before marking of the called line circuit can be effected.

Accordingly, the present invention provides a scanner and translator-marker arrangement wherein translation is included as an integral part of the scanning and marking operation. This is accomplished primarily by providing a translator directly in association with the line circuits and the line scanner, so that translation occurs automatically and continuously with the scanning and marking operations, thereby eliminating the need for separately accessed translating equipment or the transfer of data to and from such equipment for purposes of determining and marking particular line circuits within the system.

More particularly, the translator arrangement provided in accordance with the present invention receives from a line scanner a full decimal series of thousands, hundreds, tens and units digits and permits the selective strapping of four digits to a single output terminal assigned to a particular one of the line circuits in the system. In this way, any desired number can be created for a particular line circuit simply by providing the appropriate strapping from the available groups of digits within the translator.

Another feature of the present invention resides in the fact that only a single output from the translator is utilized to designate a particular line circuit within the system, while a translator buffer arrangement is provided in combination with the translator to regenerate a designation to select the group of line circuits including the particular line circuit being sought. In this way, the line circuit selection operation is simplified by reducing the number of designations necessary to identify a particular line circuit within a plurality of groups of line circuits.

The particular arrangement of the scanner and translator-marker combination of the present invention also provides the additional advantage that the directory number of a line circuit may be easily identified by marking the line circuit and running the line scanner to find it. Since the translator is connected between the line scanner and the line circuits, the scanning is done in terms of directory number rather than equipment number, and there is no need for a "reverse" translator to translate from equipment number to directory number.

It is therefore an object of the present invention to provide a line scanner and translator-marker arrangement for an automatic telephone system which greatly simplifies the scanning and marking arrangements for such systems.

It is a further object of the present invention to provide a line scanning and translator-marker arrangement for automatic telephone systems which provides, as an integral part of the scanning operation, a continuous generation of equipment designating signals which serve to selectively mark the line circuits of the system, to functionally survey these line circuits for service requests and selectively mark particular line circuits in a terminating mode.

It is a further object of the present invention to provide a line scanning and translator-marker arrangement which also facilitates the identification of particular line circuits by relatively simple means.

These and other objects, features and advantages of the present invention will become more apparent from the following detailed description thereof, when taken in conjunction with the accompanying drawings, wherein.

For purposes of example, the line scanner and translator-marker arrangement of the present invention may be utilized with the EPBX system disclosed in my copending application, Ser. No. 37,772, filed May 15, 1970, which application is assigned to the same assignee as the present application. However, it will be apparent from the following detailed description that the present invention is equally applicable to other types of systems and certainly is not restricted to use solely in private branch exchange systems.

Figure 1:
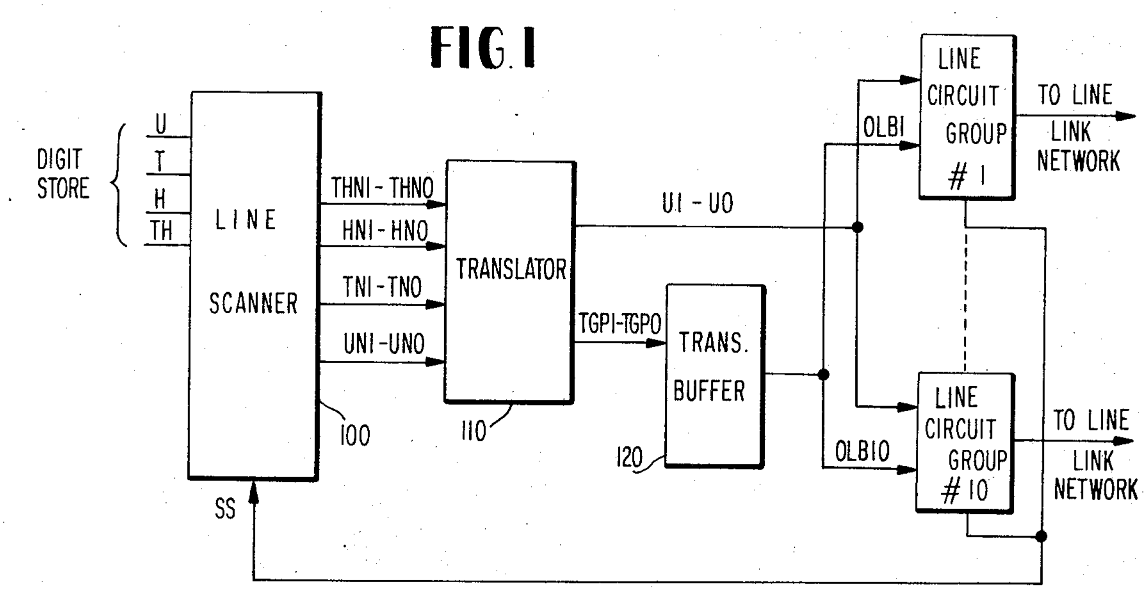
FIG. 1 is a schematic block diagram of the scanner and translator-marker arrangement of the present invention.

Referring first to Figure 1, which represents a basic block diagram of the line scanner and translator-marker arrangement, a line scanner 100 generates four decimal groups of signals THN1–THN0, HN1–HN0, TN1 –TN0 and UN1–UN0, representing thousands, hundreds, tens and units digits, respectively. This line scanner may be of the type including a decimal counter arrangement made up of a plurality of counter circuits which are responsive to application of clock pulses for generating a decimal series of signals. In such an arrangement, the signals are typically generated in sequential order, so that this line scanner effectively takes the form of a decimal counter. However, in accordance with the present invention, the line scanner 100 preferably scans in groups, rather than in sequential order, so as to materially reduce the number of combinations which must be generated to survey the entire number of line circuits within the system. This may be easily accomplished, for example, by first enabling all outputs of the units, tens and hundreds leads and then begin scanning the thousands leads one at a time until a stop scan signal is generated in one of the line circuit groups. A sequencer within the line scanner then shifts the scanning to the hundreds outputs, while maintaining the tens and units outputs enabled until a stop scan signal is once again received from a line circuit group. The sequencer in the line scanner then advances so as to scan the tens group of outputs while maintaining the units group enabled. A stop scan signal from a line circuit group will then advance the sequencer for the last time so as to effect a scanning of the units outputs. At each stage of the group scanning, the lead in the group of outputs scanned which resulted in generation of the stop scan signal remains enabled, so that once four scans have been completed one output in each of the thousands, hundreds, tens and units groups will remain enabled, thereby effecting selection of a single line circuit requesting service.

In the terminating mode, the digits of the called line circuit are forwarded directly from the line scanner on leads U, T, H and TH to the translator 110 to cause the called line to be marked.

Connected to the outputs of the line scanner is a translator 110 which generates a single output U1–U0 for various combinations of input digits from the line scanner in accordance with strapping within the translator. The outputs U1–U0 designate the particular line circuit within a line circuit group and the outputs TFP1–TGP0 from the translator designate the particular line circuit group desired. Since the four digits received from the line scanner are translated into a single units digit U1–U0 applied to each line circuit group, it is necessary to provide a signal which will indicate the particular line circuit group desired. Thus, the signal TGP1–TGP0 derived from the translator is forwarded to a translator buffer 120 which enables one of the line circuit groups in response thereto, so that a units designation and a line circuit group designation in coincidence will select a single line circuit.

The system illustrated in FIG. 1 provides for scanning of ten line circuit groups, each including 10 line circuits, thereby providing service for 100 line circuits. However, it should be apparent that this system is capable of handling many more than 100 line circuits in view of the fact that it is a four-digit system. Thus, by multiplying the number of translators and translator buffers connected to the line scanner, a plurality of groups of one hundred lines can be serviced by this system.

With enabling of one line circuit group by way of one of the leads OLB from the translator buffer 120 and enabling of one of the units leads U1-U0 from the translator, a single line circuit within a single line circuit group will be enabled, thereby placing a mark on the mark lead from the line circuit to the line link network as part of the path finding operation, for example, as described in connection with the aforementioned copending application, Ser. No. 37,772. The line circuit which is marked may be the result of a request for service in an originating mode detected by running of the line scanner, or may be a designated called party line circuit, the number of which is received directly from the digit store. Either operation produces an enabling of one line in each of the four decimal groups of outputs from the line scanner 100 to the translator 110, which will provide enabling of one of the units leads from the translator to the various line circuit groups. Thus, the arrangement of the present invention may be utilized in the reverse sense to detect the identity of a particular line circuit by merely marking the line circuit so as to enable one of the units leads at the output of the translator 110 and then operate the scanner to scan until it reaches a count corresponding to the enabled leads extending from the translator 110 to the line scanner 100. When the line scanner 100 is finally stopped by the last stop scan signal, the condition of the counters within the line scanner designate the identity of the line circuit.

The specific details of the line scanner 100 are not described and illustrated herein since any scanner circuit of conventional configuration which provides a successive decimal count on a plurality of groups of output leads is capable of functioning in the system disclosed herein. While, as indicated above, it is preferable to scan the decimal groups of outputs from the line scanner in groups, rather than in sequential order, such operation is not essential. In any event, the provision of a line scanner which is capable of scanning the outputs in groups rather than in sequential order through use of proper logic circuitry and a control sequencer arrangement would be within the ability of one of ordinary skill in the art.

Figure 2:
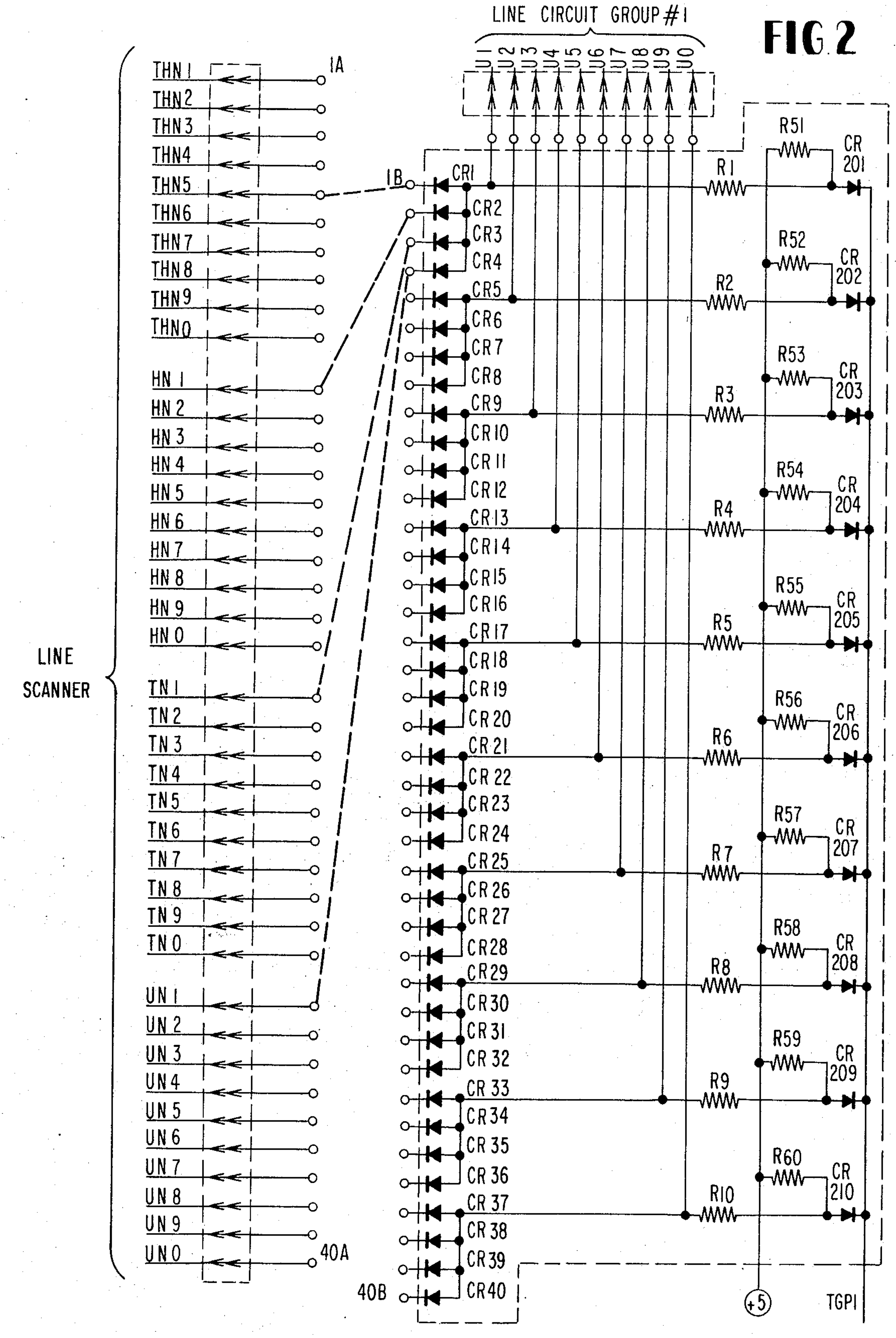
FIG. 2 is a schematic circuit diagram of one representative stage of the translator arrangement.

The details of the translator 110 are illustrated in FIG. 2. In this figure, there is disclosed one portion of the translator which relates to the outputs for one line circuit group. In order to provide outputs for all of the line circuit groups served by the translator, the particular arrangement illustrated in Figure 2 is merely duplicated for each line circuit group.

As seen in Figure 2, four groups of inputs are derived from the line scanner; these groups including a thousands group of lines THN1–THN0, a hundreds group of lines HN1–HN0, a tens group of lines TN1-TN0, and a units group of lines UN1–UN0. Thus, by enabling one line in each of the four groups of input lines to the translator 110, the line scanner will generate a four digit number. The input lines from the line scanner are connected to input terminals 1A–40A of a strapping panel arrangement having output terminals 1B–40B. The output terminals 1B–40B are connected together by suitable diodes in groups of four to respective output lines U1–U0. Thus, by strapping the four output terminals of each group to selective input terminals in the four input groups of lines to the translator, a four-digit designation will be converted to an enabling output for a single line circuit. In the example illustrated in Figure 2, the first line circuit of line circuit group 1 connected to the output lead U1 from the translator represents the number 5111 in view of the strapping between terminals 5A–1B, 11A–2B, 21A–3B and 31A–4B. When the line scanner enables the lines THN5, HN1, TN1 and UN1, the strapping in the translator will enable the output U1 therefrom.

Figure 4A:
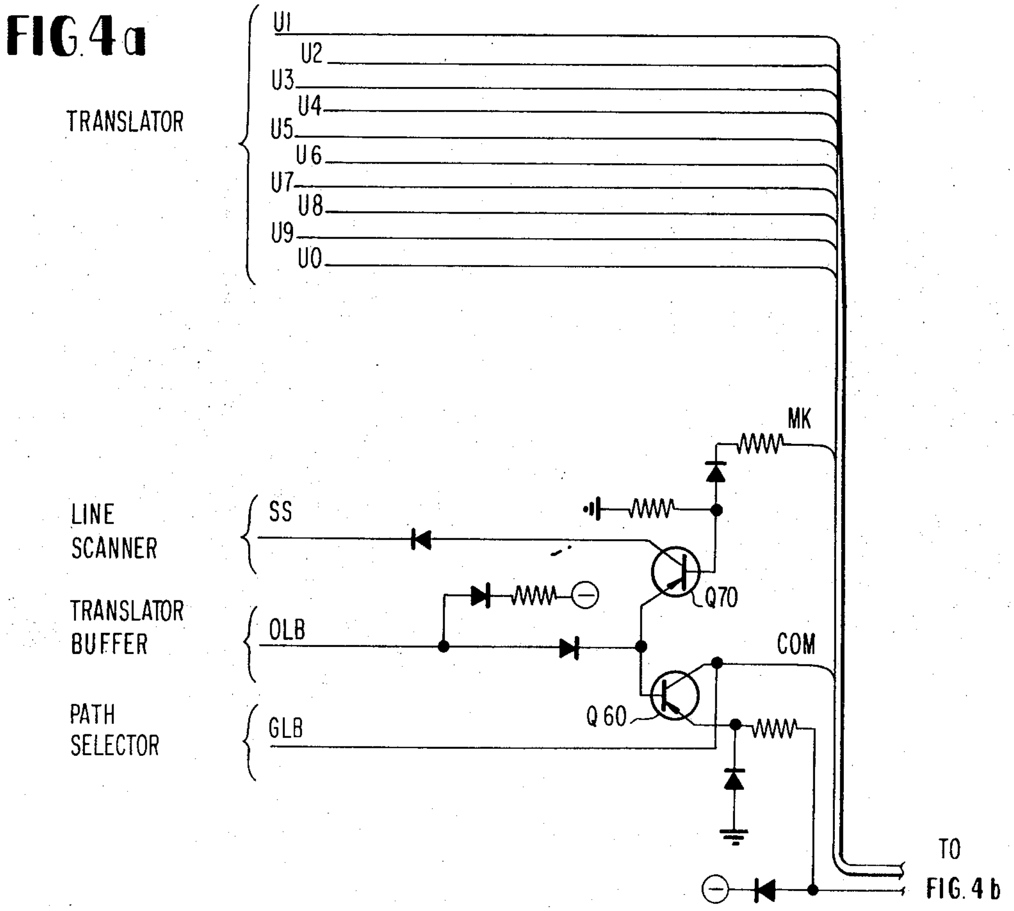
FIGS. 4*a* and 4*b*, when combined, provide a schematic circuit diagram of one line circuit group.
Figure 4B:
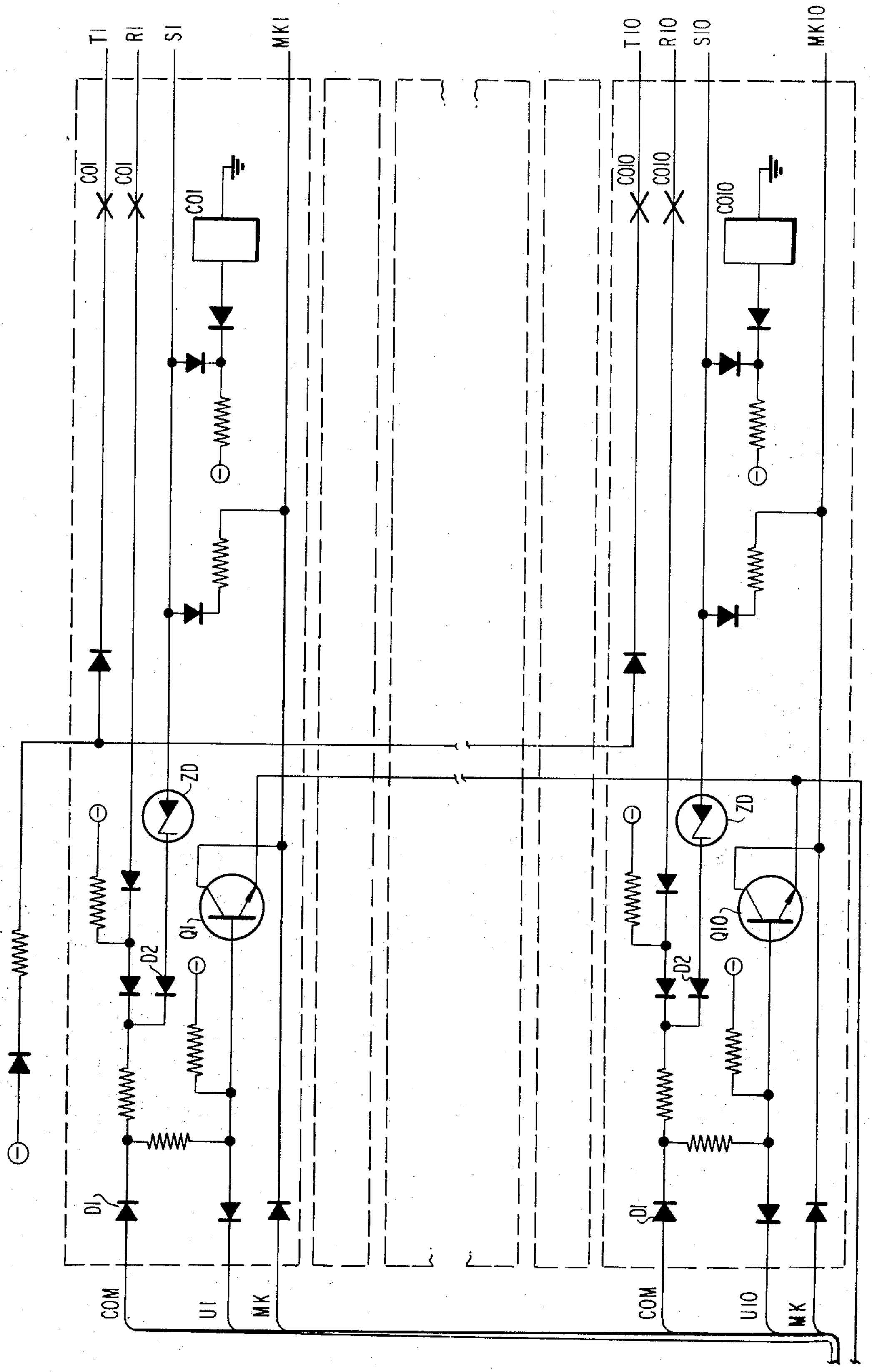

The outputs U1–U0 from the translator 110 are applied to the respective line circuit groups to enable the individual line circuits therein. A typical line circuit group is illustrated in FIGS. 4A and 4B. A portion of the first and last line circuit in the group of ten line circuits relating to the line scanning and marking operation is illustrated in FIG. **4*b*. Each of the line circuits includes a transistor Q1–Q10, respectively, which must be turned on before the line circuit can perform any of a number of its functions. Thus, the unit leads U1–U0 from the translator 110** are applied to the respective line circuits at the base of the transistor Q1-Q10, respectively, therein. When one of these units leads is enabled, the transistor Q1–Q10 in the particular line circuit may be rendered conductive, thereby placing a negative potential on the collector thereof, which is connected to the mark lead. The negative potential mark will then extend out on the mark lead to the switching matrix and mark the line circuit for purposes of the path finding operation. When path finding is complete and a path to the marked line circuit has been found, ground will be placed on the sleeve lead S to the line circuit, thereby releasing the normally operated relay CO in the line circuit so as to open the contacts of the relay in the tip T and ring R leads therein.

As already indicated, the unit leads from the translator 110 merely designate the line circuit location within the line circuit group, but do not designate the particular line circuit group containing that line circuit. Normally, the thousands, hundreds and tens digits are used to indicate the thousands group of line circuits and the particular line circuit group; however, due to the particular arrangement of the translator which provides only a single output designating the line circuit, means must be provided to also designate the line circuit group which includes the particular line circuit. This is provided by circuitry in the translator 110 and by the translator buffer 120. Looking first to FIG. 2, it is seen that each output line U1–U0 is connected through a suitable resistance and diode arrangement to an output TGP1. Thus, if any one of the lines U1–U0 for that particular line circuit group is enabled, an output will be provided on lead TGP1 to the translator buffer 120. Thus, for ten line circuit groups, there will be ten arrangements such as illustrated in FIG. 2 providing signals TGP1–TGP0 to the translator buffer 120.

Figure 3:
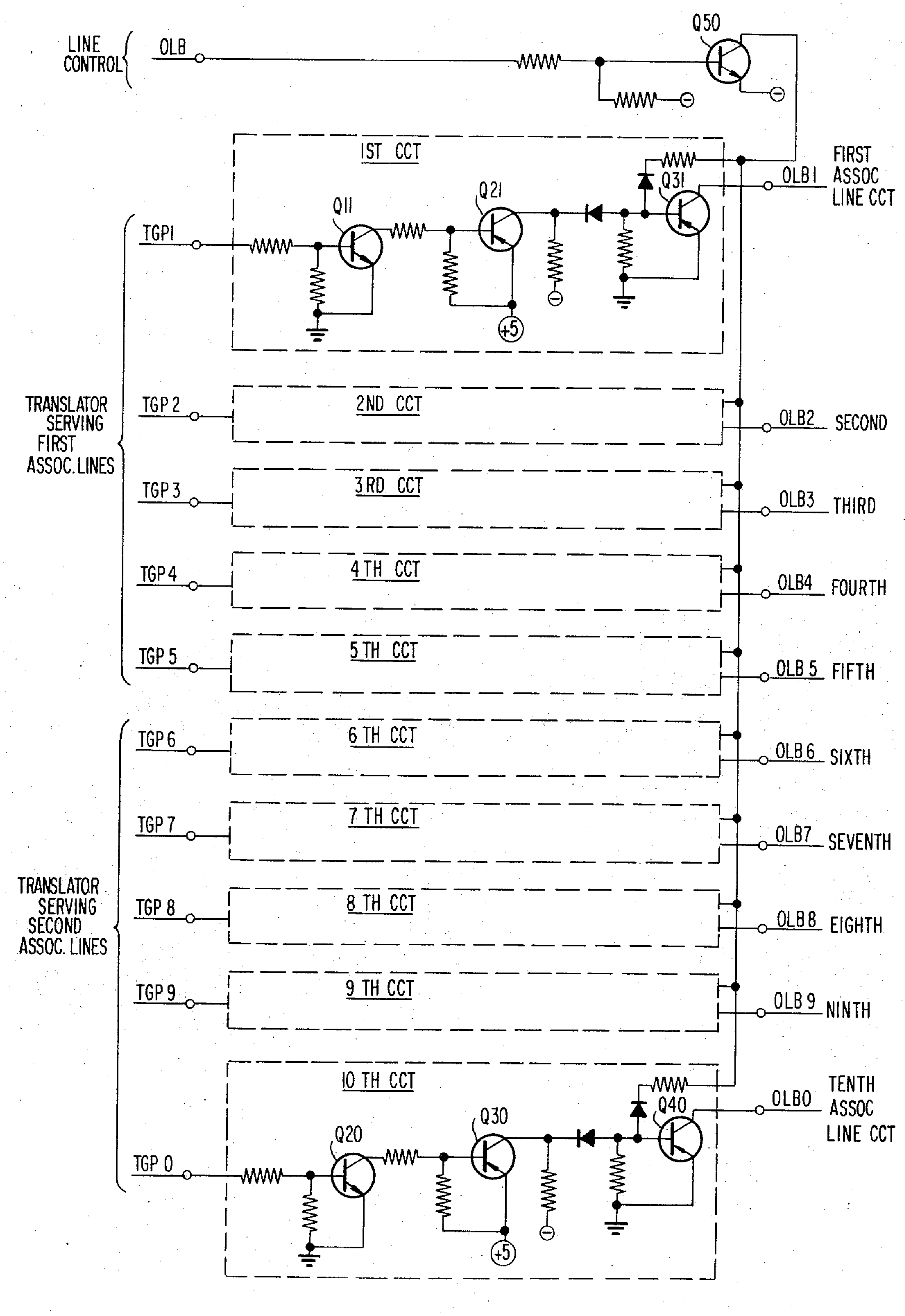
FIG. 3 is a schematic circuit diagram of a portion of the translator buffer.

As seen in FIG. 3, the translator buffer includes ten buffer circuits, all of which are enabled under control of the line control (not shown) from input OLB which turns off the transistor Q50 removing negative potential from the base of the transistors Q31–Q40. An input on one of the lines from the translator, for example, TGP1, will render transistors Q11 and Q21 conductive, thereby turning off transistor Q31 to remove ground from line OLB1 to the line circuit group number 1. Thus, depending upon which of the outputs TGP1-TGP0 is enabled from the translator, one of the outputs OLB1-OLB0 to a line circuit group will be enabled.

The OLB1 lead from the translator buffer 120 is received in the line circuit group as seen in FIG. 4a at the base of a transistor Q60. When ground is removed from lead OLB1, the transistor Q60 is rendered conductive, thereby placing ground on the collector which is connected to the common inputs to each of the line circuits in the group. This common ground provides the selected line circuit with a source of additional base current for its associated transistor Q(1–10) to ensure that Q(1–10) remains in saturation during subsequent operations, particularly with regard to pathfinding which imposes a heavy current load on the mark lead.

The mark lead in each line circuit of the group, in addition to extending forward to the switching matrix, also extends back to the common circuitry for the line circuit group along the mark lead through a diode to the base of a transistor Q70 (FIG. 4a). Thus, during scanning of the line circuits, if a line requesting service is scanned, a mark will extend from the mark lead back into the control circuitry for the line circuit group and render transistor Q70 conductive, thereby generating a stop scan signal SS, which is applied to the line scanner and serves to stop the scanning operation. If scanning is effected by groups, rather than in sequential order, the stop scan signal SS not only stops the scanning but also advances the sequencer in the line scanner, so as to begin scanning of a new group.

The operation of the present invention during normal scanning of the line circuits to detect a request for service provides for a running of the line scanner to generate units, tens, hundreds, and thousands digits by enabling selective lines to the translator 110. Due to the particular manner in which the digit lines from the line scanner are strapped on the strapping panels in the translator 110, the various line circuits will be surveyed by the selective enabling of the unit lines U1–U0 from the translator. With enabling of one of the leads U1–U0 in FIG. 4a, the line circuit associated with each unit lead, which is enabled, will be scanned. If the line circuit is requesting service, the line transistor Q(1–10) will be turned on so as to extend a negative potential mark back on the common mark lead through the diode D1 to the base of transistor Q70, thereby turning on this transistor and providing a stop scan signal to the line scanner on line SS. The line scanner is then stopped and the negative potential mark from the line transistor extends forward on the mark line MK to the switching matrix, enabling path finding to the line circuit.

In the case where a line circuit is connected to a central office trunk which requests identification of that line circuit, the central office signals through the trunk to the common control in the EPBX requesting application of a positive voltage signal to the sleeve lead which will be detected by the zener diode ZD and applied to the units lead in the line circuit via the resistors R10 and R11 to turn on transistor Q1, thus marking the line to be identified. The common control then operates the line scanner to find the marked line. When the lead U1 is enabled, Q1 is turned on and, via lead MK, provides base current to turn on Q70 to generate a stop scan signal. The line scanner is then stopped by the stop scan signal and the condition of the counters within the line circuit then represent the line number of the particular line circuit.

Thus, the translator arrangement provided in accordance with the present invention permits two-way operation in that scanning may be effected through the translator from the line scanner to detect a line circuit requesting service or a marked line to be identified, and marking from the line scanner through the translator into the line circuit may be effected to extend a call to a particular called line circuit. This is accomplished without the addition of equipment, thereby providing for the achievement of two important functions within the system by the same combination of circuits. The advantages of such an arrangement are clearly apparent from the standpoint of economy in the system and efficiency of operation.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A line scanner and translator-marker arrangement for a telephone system comprising, line scanning means generating a plurality of digit designating signals on individual output lines, translator means for energizing a plurality of output terminals selectively in response to various combinations of said digit designating signals received on said output lines from said line scanning means and a plurality of line circuits each connected to a respective one of said plurality of output terminals.

2. A line scanner and translator-marker as defined in claim 1, wherein each of said line circuits includes mark means for generating a mark signal on a mark line extending out of said line circuit, said mark means being actuated in response to the energized of the said output terminal connected to said line circuit.

3. A line scanner and translator-marker as defined in claim 2, wherein said translator means includes a strapping panel for connecting selected groups of output lines carrying said digit designating signals from said line scanning means to each of said output terminals.

4. A line scanner and translator-marker as defined in claim 3, wherein said line circuits are divided into groups and said translator means includes a plurality of strapping panels for connecting selected groups of output lines carrying said digit designating signals from said line scanning means to each of said output terminals in groups corresponding to said groups of line circuits.

5. A line scanner and translator-marker as defined in claim 4, wherein said translator means further includes a group designation means associated with each strapping panel for generating a group identification signal when any output terminal associated with the particular strapping panel is energized, and further including translator buffer means responsive to said identification signals for inhibiting said mark means in all line circuits except those forming the group identified by said identification signal.

6. A line scanner and translator-marker as defined in claim 5, wherein said mark means includes a line transistor connected to said translator buffer means and said translator means so as to be enabled by coincident signals therefrom.

7. A line scanner and translator-marker as defined in claim 6, wherein the output of said line transistor is connected to said mark line extending out of said line circuit and is applied to said line scanning means to stop the generation of said digit designating signals.

8. A line scanner and translator-marker as defined in claim 1, wherein said translator mean is permanently connected between said line scanning means and said line circuits.

9. A line scanner and translator-marker as defined in claim 1, wherein said translator means includes a strapping panel for connecting selected groups of output lines carrying said digit designating signals from said line scanning means to each of said output terminals.

10. A line scanner and translator-marker as defined in claim 1, wherein said line circuits are divided into groups and said translator means includes a plurality of strapping panels for connecting selected groups of output lines carrying said digit designating signals from said line scanning means to each of said output terminals in groups corresponding to said groups of line circuits.

11. A line scanner and translator-marker as defined in claim 10, wherein said translator means further includes a group designation means associated with each strapping panel for generating a group identification signal when any output terminal associated with the particular strapping panel is energized, and further including translator buffer means responsive to said identification signals for inhibiting said mark means in all line circuits except those forming the group identified by said identification signal.

12. A line scanner and translator-marker as defined in claim 11, wherein said mark means includes a line transistor connected to said translator buffer means and said translator means so as to be enabled by coincident signals therefrom, the output of said line transistor being connected to said mark line extending out of said line circuit and being applied to said line scanning means to stop the generation of said digit designating signals.

* * * * *